US011097286B2

(12) United States Patent
Wenzel et al.

(10) Patent No.: US 11,097,286 B2
(45) Date of Patent: Aug. 24, 2021

(54) HIGH EFFICIENCY AIRLESS SPRAY TIP DESIGN AND USE

(71) Applicant: Wagner Spray Tech Corporation, Plymouth, MN (US)

(72) Inventors: Everett A. Wenzel, Minneapolis, MN (US); Alfred Goehring, Salem (DE); Thomas Jeltsch, Friedrichshafen (DE)

(73) Assignee: Wagner Spray Tech Corporation, Plymouth, MN (US)

( * ) Notice: Subject to any disclaimer, the term of this patent is extended or adjusted under 35 U.S.C. 154(b) by 15 days.

(21) Appl. No.: 15/862,260

(22) Filed: Jan. 4, 2018

(65) Prior Publication Data

US 2018/0185855 A1 Jul. 5, 2018

Related U.S. Application Data

(60) Provisional application No. 62/442,565, filed on Jan. 5, 2017.

(51) Int. Cl.
*B05B 1/02* (2006.01)
*B05B 7/02* (2006.01)
(Continued)

(52) U.S. Cl.
CPC .................. *B05B 1/02* (2013.01); *B05B 7/02* (2013.01); *B05B 9/002* (2013.01); *B05B 9/01* (2013.01);
(Continued)

(58) Field of Classification Search
CPC .. B05B 1/02; B05B 7/02; B05B 9/002; B05B 9/01; B05B 1/267; B05B 1/06;
(Continued)

(56) References Cited

U.S. PATENT DOCUMENTS 3,202,360 A * 8/1965 O'Brien .................. B05B 15/50 239/119
3,865,314 A 2/1975 Levey et al.
(Continued)

FOREIGN PATENT DOCUMENTS

CN 201244528 Y 5/2009
CN 103464324 A 12/2013
(Continued)

OTHER PUBLICATIONS

International Search Report and Written Opinion from Application No. PCT/US2018/012351, dated Apr. 26, 2018, 17 pages.
(Continued)

*Primary Examiner* — Tuongminh N Pham
(74) *Attorney, Agent, or Firm* — Wesley W. Malherek; Kelly, Holt & Christenson, PLLC

(57) ABSTRACT

A method of identifying a spray tip from a plurality of spray tips based on a selected fluid is presented. The method comprises the step of selecting the fluid. The fluid is characterized by a set of given physical parameters. The method also comprises the step of selecting an application pressure. The application pressure is sufficient to cause atomization of the fluid through the spray tip. The method also comprises the step of selecting the spray tip for the fluid applicator, based on characteristics of the fluid. The spray tip is selected based on an ability to process the fluid. The spray tip is selected such that the fluid has a viscosity on the order of 10 mPa·s in the shear rate range of $10^4$-$10^6$ $s^{-1}$ to ensure a turbulent flow downstream of a pre-orifice.

6 Claims, 16 Drawing Sheets

(51) Int. Cl.

| | |
|---|---|
| ***B05B 9/01*** | (2006.01) |
| ***B05B 9/00*** | (2006.01) |
| ***G06F 30/17*** | (2020.01) |
| ***G06F 30/23*** | (2020.01) |
| *G06F 30/20* | (2020.01) |

(52) U.S. Cl.
CPC .............. *G06F 30/17* (2020.01); *G06F 30/23* (2020.01); *G06F 30/20* (2020.01)

(58) Field of Classification Search
CPC ... B05B 9/08; G06F 17/5018; G06F 17/5086; G06F 17/5009
See application file for complete search history.

(56) References Cited

U.S. PATENT DOCUMENTS

| | | | | |
|---|---|---|---|---|
| 3,930,619 | A * | 1/1976 | Levey | B05B 1/042 239/526 |
| 4,331,296 | A * | 5/1982 | Levey | B05B 1/28 239/288 |
| 4,760,956 | A * | 8/1988 | Mansfield | B29B 7/7438 239/294 |
| 6,264,115 | B1 * | 7/2001 | Liska | B05B 15/534 239/119 |
| 2005/0048136 | A1 | 3/2005 | Yanagita et al. | |
| 2007/0129469 | A1 | 6/2007 | Befurt et al. | |
| 2009/0200398 | A1 * | 8/2009 | Duru | B05B 7/066 239/102.2 |
| 2011/0198413 | A1 * | 8/2011 | Thompson | B05B 9/043 239/322 |
| 2014/0367480 | A1 | 12/2014 | Toh et al. | |
| 2015/0017327 | A1 | 1/2015 | Myers et al. | |
| 2016/0303585 | A1 | 10/2016 | Wenzel et al. | |
| 2016/0375450 | A1 | 12/2016 | de Block et al. | |
| 2017/0121655 | A1 * | 5/2017 | Delplancke | A47L 15/4278 |

FOREIGN PATENT DOCUMENTS

| | | | |
|---|---|---|---|
| DE | 9310984 | U1 | 12/1993 |
| DE | 20320747 | U1 | 3/2005 |
| KR | 100288538 | B1 | 4/2001 |

OTHER PUBLICATIONS

International Preliminary Report on Patentability for International Patent Application PCT/US2018/012351, dated Jul. 18, 2019, filing date of Jan. 4, 2018, 14 pages.
Extended European Search Report for European Patent Application No. 18736482.3 dated Jun. 26, 2020, 9 pages.
First Office Action for Chinese Patent Application No. 201880005940.6 dated Sep. 16, 2020, 18 pages.
Second Office Action for Chinese Patent Application No. 201880005940.6 dated Apr. 9, 2021, 12 pages.

* cited by examiner

400

500

1050

1200

1300

HIGH EFFICIENCY AIRLESS SPRAY TIP DESIGN AND USE

CROSS-REFERENCE TO RELATED APPLICATION

The present application is based on and claims the benefit of U.S. provisional patent application Ser. No. 62/442,565, filed Jan. 5, 2017, the content of which is hereby incorporated by reference in its entirety.

BACKGROUND

Different fluids have different physical properties that dictate atomization rates, and atomization patterns. For the average consumer applying a spray system, determining which conditions are necessary for achieving an even spray pattern can be difficult.

SUMMARY

A method of identifying a spray tip from a plurality of spray tips based on a selected fluid is presented. The method comprises the step of selecting the fluid. The fluid is characterized by a set of given physical parameters. The method also comprises the step of selecting an application pressure. The application pressure is sufficient to cause atomization of the fluid through the spray tip. The method also comprises the step of selecting the spray tip for the fluid applicator, based on characteristics of the fluid. The spray tip is selected based on an ability to process the fluid. The spray tip is selected such that the fluid has a viscosity on the order of 10 mPa·s in the shear rate range of $10^4$-$10^6$ $s^{-1}$ to ensure a turbulent flow downstream of a pre-orifice.

The above summary is not intended to describe each illustrated embodiment or every implementation of the present disclosure

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1A:
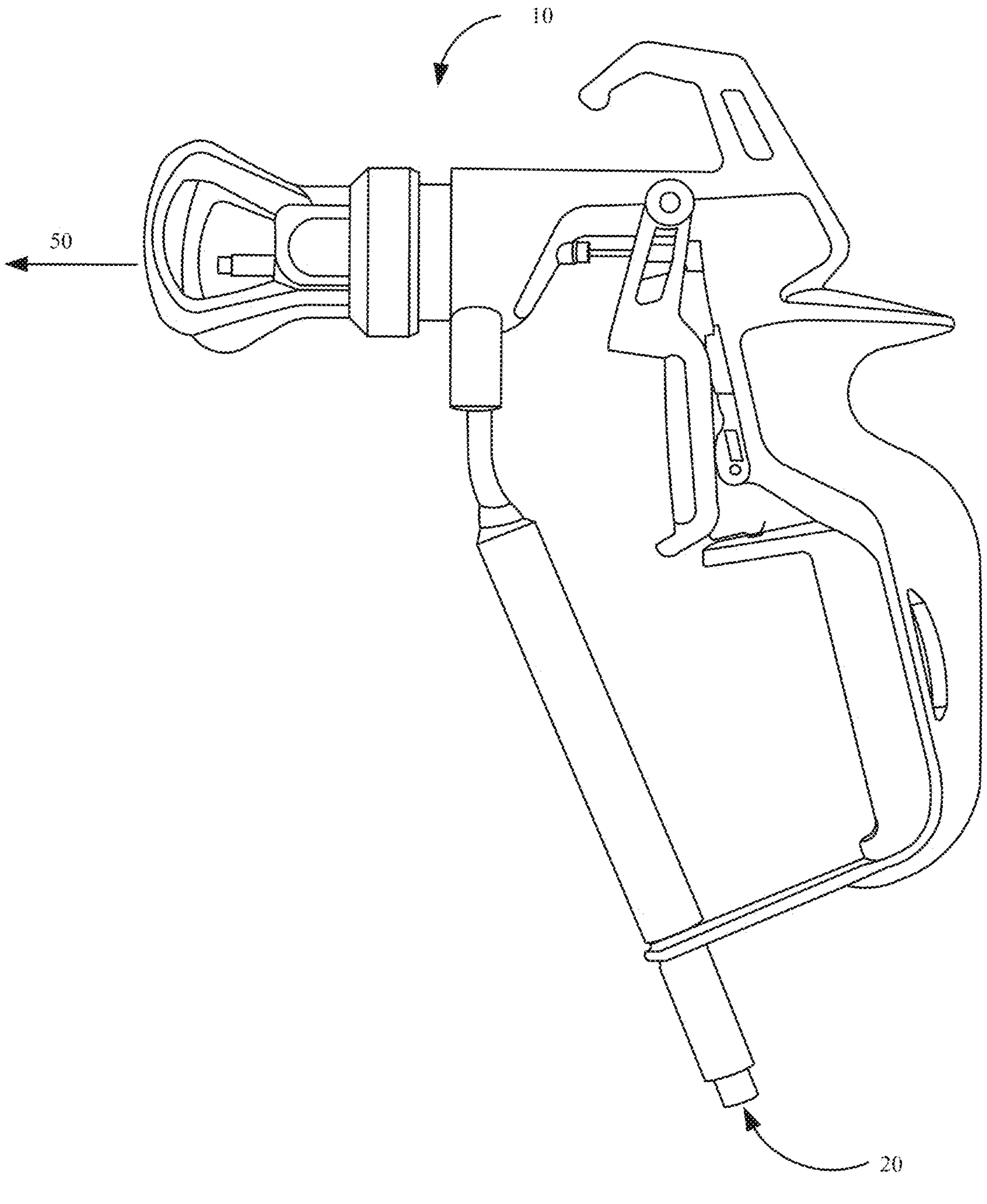
FIGS. 1A and 1B illustrate a fluid spray applicator and system in accordance with one embodiment of the present invention.

While embodiments of the present invention are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF ILLUSTRATIVE EMBODIMENTS

Different fluids have different physical parameters, e.g. viscosities. For example, within the paint family, different paints, primers, overcoats, etc. all have different properties. Additionally, different fluids may have temperature-dependent or shear-rate-dependent viscosities. In order to achieve an even spray pattern of a fluid across a surface, it is necessary to atomize the fluid. Atomization can be achieved in various ways. One particular way is using an airless spray system. In such a system, it may be necessary to achieve a turbulent fluid flow upstream of the atomizing orifice, for example, by means of a pre-orifice. Specific technological design and insights in fluid dynamics help to design spray systems and methods, such as those described herein, that provide improved spray pattern results.

As a result, different fluid applications may benefit from different spray tip designs, for example because of differing viscosities, application temperature, etc. At least some embodiments described herein allow for the design of a fluid spray tip based on known parameters of a particular fluid application. Different spray tip designs may, therefore, result based on the fluid to be applied. For example, at least some of the spray tip designs described in U.S. Patent Application Publication No. 2016/0303585 A1, published Oct. 20, 2016, which is hereby incorporated in its entirety, are designed for better application results with some fluids as compared to others.

Figure 1B:
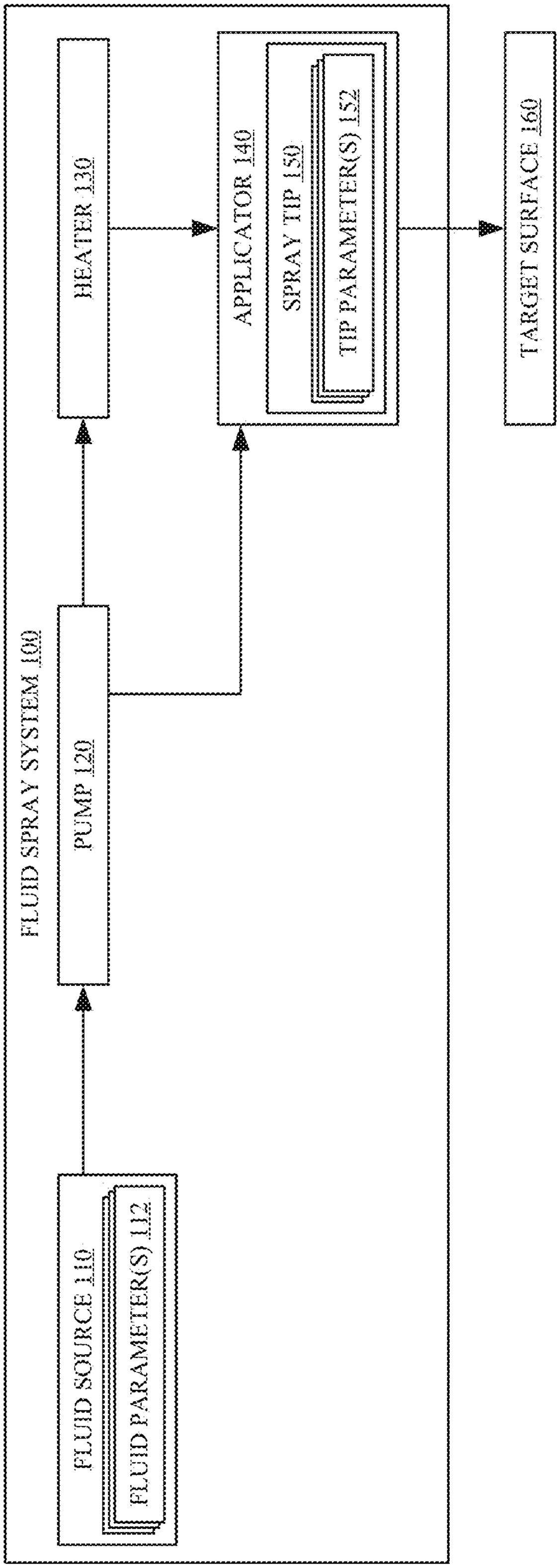

FIGS. 1A and 1B illustrate a fluid spray applicator and system in accordance with one embodiment of the present invention. FIG. 1A illustrates a spray gun 10, for example, for use in a paint spraying system. Paint, or another exemplary fluid, enters through spray gun inlet 20, and exits from spray gun outlet 50, after passing through a fluid channel (not shown) within spray gun 10. In one embodiment, a spray tip (not shown) is attached to outlet 50 to produce a desired spray pattern. The spray tip may include a spray tip pre-orifice design designed based on known fluid and application properties, as described in greater detail below. Spray tips may be built into spray gun 10, as internal components. Alternatively, spray gun 10 may be configured to interchangeably receive different spray tips, with different pre-orifice designs, each design configured to provide excellent performance based on anticipated properties of a fluid to be sprayed, and/or application conditions. Spray tips may be selected such that, at outlet 50, turbulent fluid flow of a fluid is increased.

FIG. 1B illustrates a fluid spray system 100, specifically an airless system, in accordance with one embodiment of the present invention. Fluid spray system 100 illustratively retrieves fluid from a fluid source 110 for application on a target surface 160. Fluid source 100 may include a fluid with one or more fluid parameters 112. For example, density, viscosity, etc. Further, each of such parameters may vary with temperature and/or humidity.

Fluid from fluid source 110 is provided to a pump 120, where the fluid is pressurized. Fluid may be pressurized to an application pressure, for example. Alternatively, fluid may be over-pressurized by pump 120 in order to compensate for pressure losses associated with the transportation mechanism between pump 120 and applicator 140. In some embodiments, the pressure of fluid exiting pump 120 is set manually by a user. For example, low pressure systems may include an application pressure below 3000 PSI.

Fluid spray system 100 also includes a heater 130 to heat the fluid to a given temperature prior to application. Heating a fluid to a desired application temperature may be helpful in order to ensure consistent application patterns from use to use. For example, some paints have temperature dependent viscosity, and therefore may behave differently when applied by a user in a cold vs. a warm application condition. Therefore, heating the fluid to a consistent temperature, and spraying the fluid at a fixed temperature, may help to reduce deviations in spray patterns from use to use. However, it is expressly contemplated that embodiments may be practiced that omit a heater, for example if a fluid application is to occur at ambient temperatures. In such a scenario, pump 120 may deliver fluid directly to applicator 140.

Fluid spray system 100 also includes an applicator 140. Applicator 140 may include a spray tip 150, which may have one or more spray tip parameters 152. Spray tip parameters 152 can include, for example, material composition as well as internal geometric design. Internal geometries of different spray tips 150 may allow for better performance with one fluid over another, based on the fluid parameters 112. Spray tip 150 may be designed, for example based on fluid parameters 112, to ensure sufficient turbulence of a fluid prior to delivery from applicator 140 to target surface 160.

For example, a spray tip 150 may include a turbulating chamber, an expansion chamber, a contraction chamber, or a plurality of such chambers in succession. The spray tip parameters 152 may be selected or otherwise determined based on anticipated use with a specific fluid, for example such that the desired fluid achieves a desired level of turbulence prior to application on target surface 160. For example, a user of a fluid spray system 100 may obtain a kit of interchangeable spray tips 150 such that tips can be used for different fluids. The use of optimized, or spray tips specifically designed for different fluids may help to ensure that a user achieves a desired fluid spray pattern.

A successful fluid spray system design requires consideration of several elements, including the spray tip, the fluid rheology of the fluid being applied to surface 160, and rheology modification options. The fluid should have a rheology consistent with application at low pressures, specifically a sufficient viscosity in a desired shear rate range. Rheology modification mechanisms, such as heating, can be helpful to tune fluid rheology for a given application. Shear-thinning behavior for a paint can be improved, in one embodiment, through the use of modifiers, or additives. Increased shear-thinning behavior may produce improved spray patterns. For example, the ACRYSOL™ line of modifiers, provided by DOW® (Dow Chemical Company with headquarters in Midland, Mich.) that increases shear-thinning, and can produce a pseudoplastic rheology profile. A pseudoplastic fluid is a non-Newtonian fluid that loses viscosity when shear rate increases, but recovers viscosity when the shear rate decreases.

One potential additive is the DOW-ACRYSOL-ASE modifier. ASE thickeners tend to be high in molecular weight, which allows for efficient thickening. Another potential additive is the DOW-ACRYSOL-ASE-60-ER, which is a highly shear-thinning rheology modifier that provides resistance to sedimentation and sagging. The DOW-ACRYSOL-HASE modifier is another efficient and strong shear-thinning modifier. Additionally, other modifiers are also available.

At least some of the systems and methods described herein may be useful with one or more spray tips described and illustrated in U.S. Patent Application Publication No. 2016/0303585.

Figure 2:
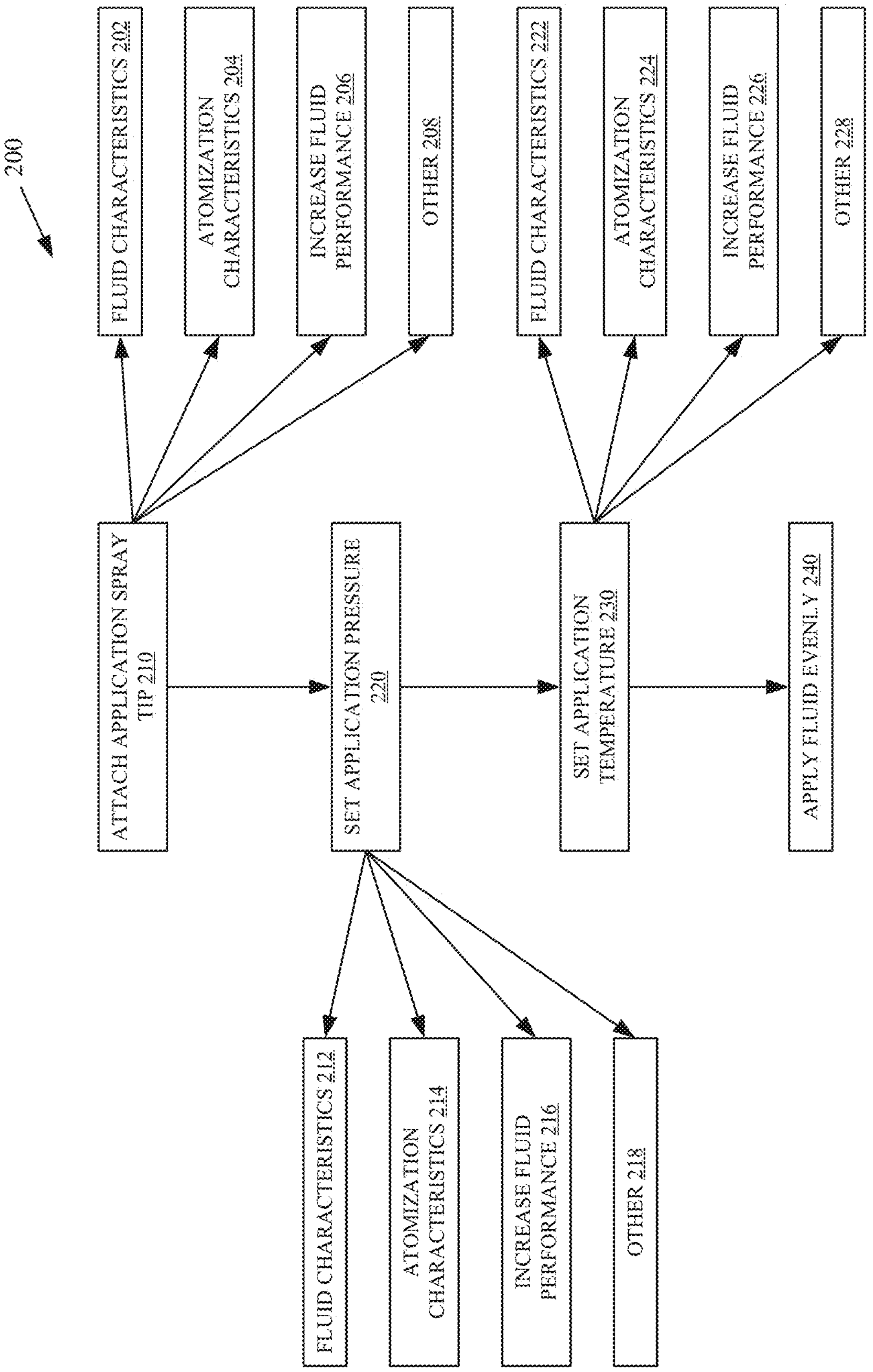
FIG. 2 is a flow diagram of a method of applying an even layer of fluid to a surface in accordance with one embodiment of the present invention.

FIG. 2 illustrates a method of applying an even layer of fluid to a surface in accordance with one embodiment of the present invention. Method 200 may be used, with fluid spray system 100, for example, in order to apply a fluid from a fluid source 100 to a target surface 160 (shown in FIG. 1B). However, while method 200 is described in the context of spray system 100, it can also be implemented within other appropriate systems. Spray tip 150 may be selected, for example, based on fluid characteristics of the fluid to be applied, as well as the application parameters—e.g. temperature, humidity, etc.

At block 210, an application spray tip is selected and attached to an applicator. For example, spray tip 150 may be selected based on one or more fluid characteristics, as indicated in block 202. Additionally, spray tip 150 may be selected based on tip parameters 152 which may achieve desired atomization characteristics for a fluid, as indicated in block 204. Additionally, spray tip 150 may be selected to increase performance of a particular fluid based on known shear thinning behavior (for example, to achieve a particular shear rate) of the particular fluid, as indicated in block 206. Additionally, other fluid characteristics may influence the selection of a spray tip for a given application as indicated in block 208. In one embodiment, selecting an application spray tip includes selecting one spray tip out of a kit of spray tips, each spray tip in the kit being configured for use in different application scenarios.

In block 220, an application pressure is set. Application pressure may be set based on fluid characteristics, as indicated in block 212. Additionally, application pressure may be selected to achieve desired atomization characteristics, as indicated in block 214. For example, a fluid may need to be sprayed at a sufficiently high pressure to fully atomize the dispensed fluid. However, lower pressures may also be desired. For example, low pressures, approximately 1,000 PSI or lower, may be desired. Additionally, the application pressure may be selected to ensure a sufficient flow rate is achieved to produce turbulence in a tip of a particular design, accounting for the specific shear thinning behavior of a fluid, as indicated in block 216. Additionally, however, pressure may be bounded by other constraints, as indicated in block 218.

In block 230, an application temperature is set. For example, different fluids may have temperature-dependent viscosities, such that it is necessary to heat up a fluid to a desired temperature to achieve consistent and even application of fluid. For example, in one embodiment, fluid is heated to a desired temperature and sprayed at that fixed temperature during the entirety of an operation. The application pressure may be set based on fluid characteristics, in one embodiment, as indicated in block 222. In another embodiment, application temperature may be set by atomization characteristics of a fluid, as indicated in block 224. Additionally, in another embodiment, application temperature selected to ensure the fluid viscosity falls within a desirable range, accounting for the shear and temperature dependencies, as indicated in block 226. However, other constraints may dictate which temperature a fluid is applied to a surface for a given application, as indicated in block 228.

In block 240, fluid is applied evenly to a surface. For example, a user engages the trigger of an applicator, such as applicator 140, allowing fluid to flow through the applicator, interact with the internal flow path of spray tip 150, and onto a target surface 160.

Figure 3:
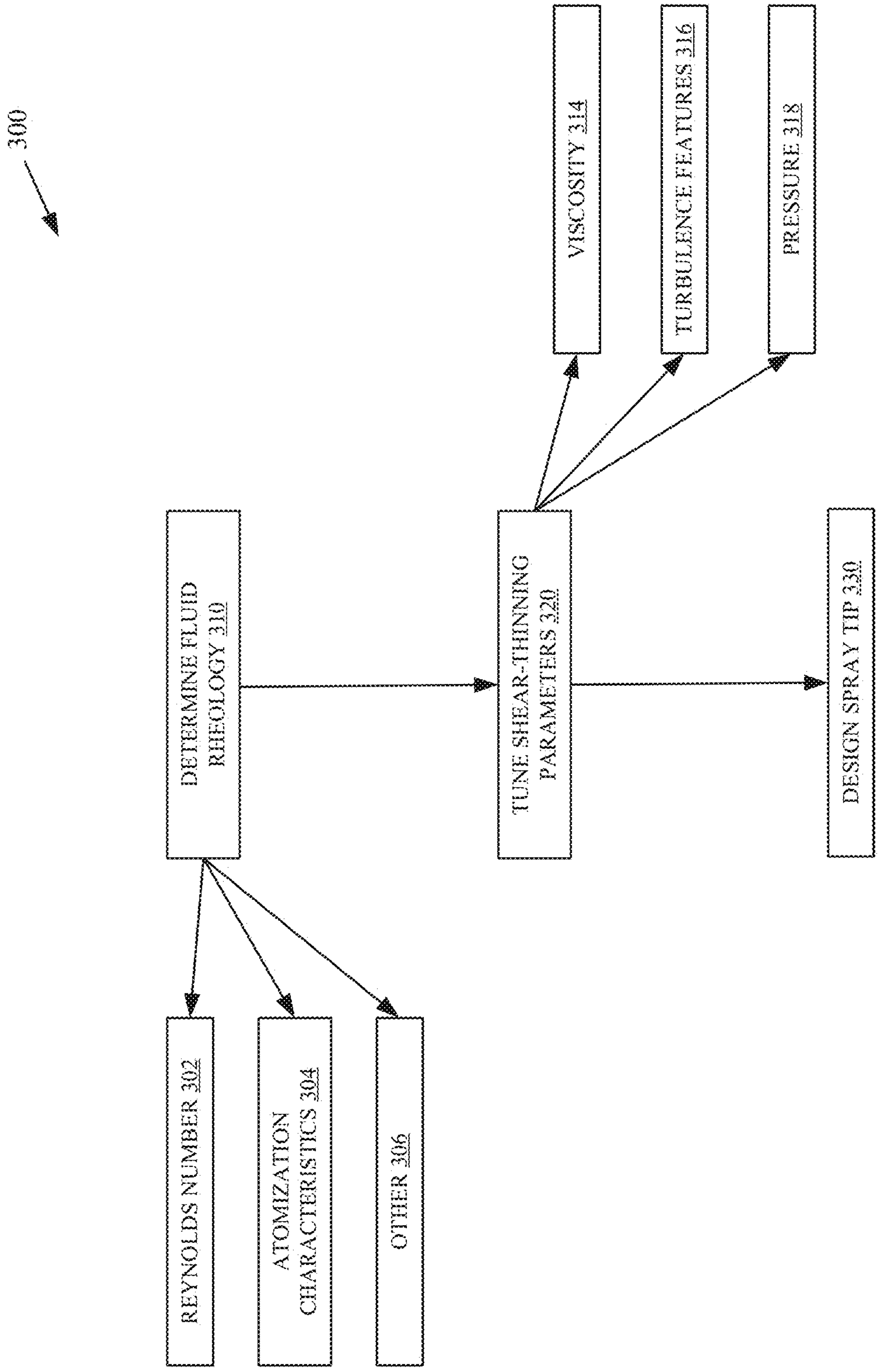
FIG. 3 is a flow diagram of a method of designing a spray tip for a given fluid in accordance with one embodiment of the present invention.

FIG. 3 illustrates a method of designing a spray tip for a given fluid in accordance with one embodiment of the present invention. Method 300 may be useful, for example, given a fluid with known properties and flow characteristics.

Different fluids have different properties, and therefore it is necessary that spray tips be designed to accommodate different characteristics of different fluids. For example, different fluids require different geometries within a spray tip to achieve the desired amount of turbulence prior to an application. Some examples of spray tip geometries are described in U.S. Patent Application Publication 2016/0303585 A1.

Method 300 may be useful to design a spray tip, such as spray tip 150 illustrated in FIG. 1, for example, with specific tip parameters 152 for a specific fluid source 110. In at least one embodiment, spray tip 150 is designed with different tip parameters 152 to accommodate a specific fluid, such that a spray tip A is more advantageously used with a fluid A than a spray tip B, while spray tip B may be more advantageously used for a fluid B than spray tip A.

In block 310, fluid rheology is determined. For example, different fluids have different Reynolds numbers under different conditions, as a function of fluid properties and operating conditions. In one embodiment, determining a fluid rheology includes determining Reynolds numbers for the fluid under different conditions, as indicated in block 302. Additionally, determining fluid rheology may include determining atomization characteristics for the given fluid, as indicated in block 304. Other fluid rheology features may also be necessary to determine, as indicated in block 306. For example, a fluid's viscosity with respect to different temperatures may be helpful, to determine both a desired spray tip configuration, and a desired application temperature. Additionally, fluid characteristics, for example viscosity, at different shear rates may be necessary to design a spray tip for a fluid for a given set of application parameters.

In block 320, flow parameters are tuned for a given fluid. For example, some flow parameters for a fluid can be adjusted. Tuning a viscosity of a fluid, as illustrated in block 314, for example, may include selecting an appropriate temperature for application of the fluid so that a desired viscosity is achieved for an application. Additionally, turbulence features may be tuned for a given fluid, as indicated in block 316. Turbulence features may include determining appropriate internal geometries to include expansion and contraction chambers that a fluid flows through within a spray tip. Additionally, pressure may be tuned for a given fluid, as indicated in block 318.

In block 330, the spray tip is designed with characteristics appropriate for the fluid rheology, particularly considering the fluid's shear thinning behavior. For example, a series of pre-orifice chambers may be sized to achieve turbulent flow for a fluid with a properly designed shear thinning behavior. For example, a total length of the spray tip may be increased or decreased, with respect to a standard spray tip. Additionally, a diameter of an internal chamber may change, or a rate of expansion/contraction may be altered in order to achieve a desired turbulence.

According to another aspect of the invention, a fluid rheology is determined by aspects of physical parameters of a fluid being applied. As mentioned, different fluids have different Reynolds numbers under different conditions, and exhibit different fluid properties under different fluid conditions. Adjusting viscosity of a fluid can be achieved in many ways, e.g. by adjusting a given mixture of fillers, polymers and dispersion particles. In one embodiment, adjusting a fluid rheology includes adjusting Reynolds numbers for a fluid under different conditions or recipes. Additionally, adjusting a fluid rheology may include adjusting atomization characteristics for the given fluid. Other fluid rheology features may also be adjustable. For example, a fluid's viscosity with respect to different temperatures may be determined empirically or via simulation data such that an application temperature can be selected. Determined parameters can be used for a desired spray tip, and a desired application temperature. Additionally, fluid characteristics at different pressures may be influenced by shear thinning parameters that are tuned for an application fluid. For example, a shear rate may be tuned for a given fluid by adjusting polymer dispersion parameters. Additionally, turbulence features may be tuned for a fluid by adjusting dispersion rates, filler particles, polymer properties or other ingredients of the fluid. Turbulence features may be suggested by appropriate geometries for expansion and contraction sections of a spray tip.

FIGS. 4-14 illustrate one example simulation for determining characteristics of spray tips for different fluids. A simulation may be useful, for example in conjunction with method 300 to determine appropriate spray tip geometry and operating constraints for a given fluid. Additionally, given pressures and internal spray tip geometries can be simulated in order to receive physical parameters of a fluid to be processed at an improved atomization result and desired spray pattern. The example presented in FIGS. 4-14 is provided for illustration purposes only and should not be considered to limit any aspect of the invention or any systems and methods described herein.

Simulations were performed to determine shear rates and strain rates experienced by fluid flowing through two different spray tips. The first spray tip is spray tip A, identified under the trade designation of NGA 519. The second spray tip, spray tip B, identified under the trade designation NESPRI®. For both styles of spray tips, water and NESPRI® paint were sprayed at a pressure of 1450 PSI. Characteristics for the NESPRI® paint are described in U.S. Patent Application Publication No. 2007/129469. The Wagner NGA tip was designed to have a turbulent inlet condition with respect to the atomizing orifice, which is not present in the tip designed for use with the paint described in the '469 patent application publication (hereinafter referred to as the '469 tip and '469 paint respectively), which does not have a pre-orifice. From the perspective of paint rheology, the NGA tip requires the transition to turbulence by means of a pre-orifice, whereas the '469 tip only transitions after the pre-orifice. Each of the tips used in the presented example include a cat eye atomizing orifice. Upstream turbulence allows the NGA tip to spray at pressures of 1000 PSI or lower, a condition desirable for many paint sprayer for, for example, efficiency, material savings, and overspray reduction.

Figure 4:
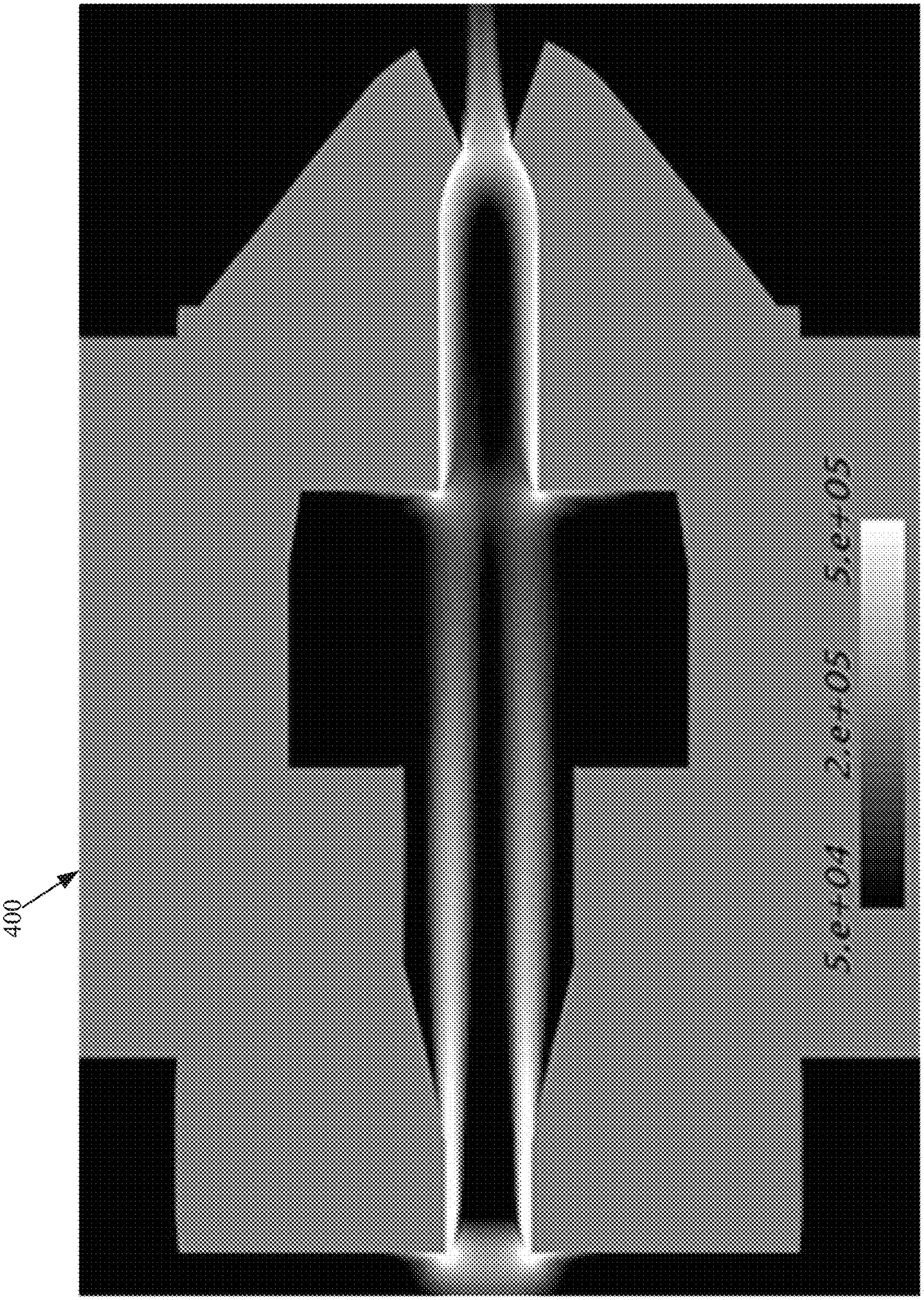
FIGS. 4-13 illustrate one example simulation for determining characteristics of spray tips for different fluids.

FIG. 4 illustrates the results 400 of a simulated flow of the '469 paint through the NGA519 tip. The results of the simulation suggested that the dominant shear rate regime in the NGA519 tip is $10^4$-$10^6$ $s^{-1}$. There are, of course, regions with lower shear, and regions with much greater shear (very near the surface, for example). The shear rate range of $10^4$-$10^6$ $s^{-1}$ is what a considerable amount of the fluid in the boundary layer and the turbulent jet exiting the pre-orifice experiences. This is also the characteristic strain rate regime. This range was then identified to be appropriate for both water and the '469 paint, and is therefore considered to be dominantly controlled by the volumetric flow rate of material and the length scale of the tip. For proper operation of the pre-orifice, it is therefore favorable for a paint to have a viscosity that results in a local Reynolds number near 1500 when the shear rate is in the range of $10^4$-$10^6$ $s^{-1}$. Therefore, it is favorable for the dynamic viscosity of paint to be on the order of 10 mPa° s in the shear rate range of $10^4$-$10^6$ $s^{-1}$.

This will promote turbulent flow in the NGA pre-orifice, which allows for spraying at reduced pressures. This is also expected to improve low pressure atomization in the '469 tip.

Currently, '469 paint, according to laboratory measurement, has a viscosity about one order of magnitude greater than the desired value in the critical shear rate range. This results in a laminar flow downstream of the pre-orifice in the NGA 519 tip, as shown in results 400. This laminar flow is demonstrated in FIG. 4, which presents the time average strain rate within the NGA tip. The lighter regions highlight the laminar boundary layer (the strain rate being in the range of $10^4$-$10^6$ $s^{-1}$, except at the solid surface where the strain rate is much greater). This laminar flow contrasts with the turbulent flow that occurs when spraying water.

Figure 5:
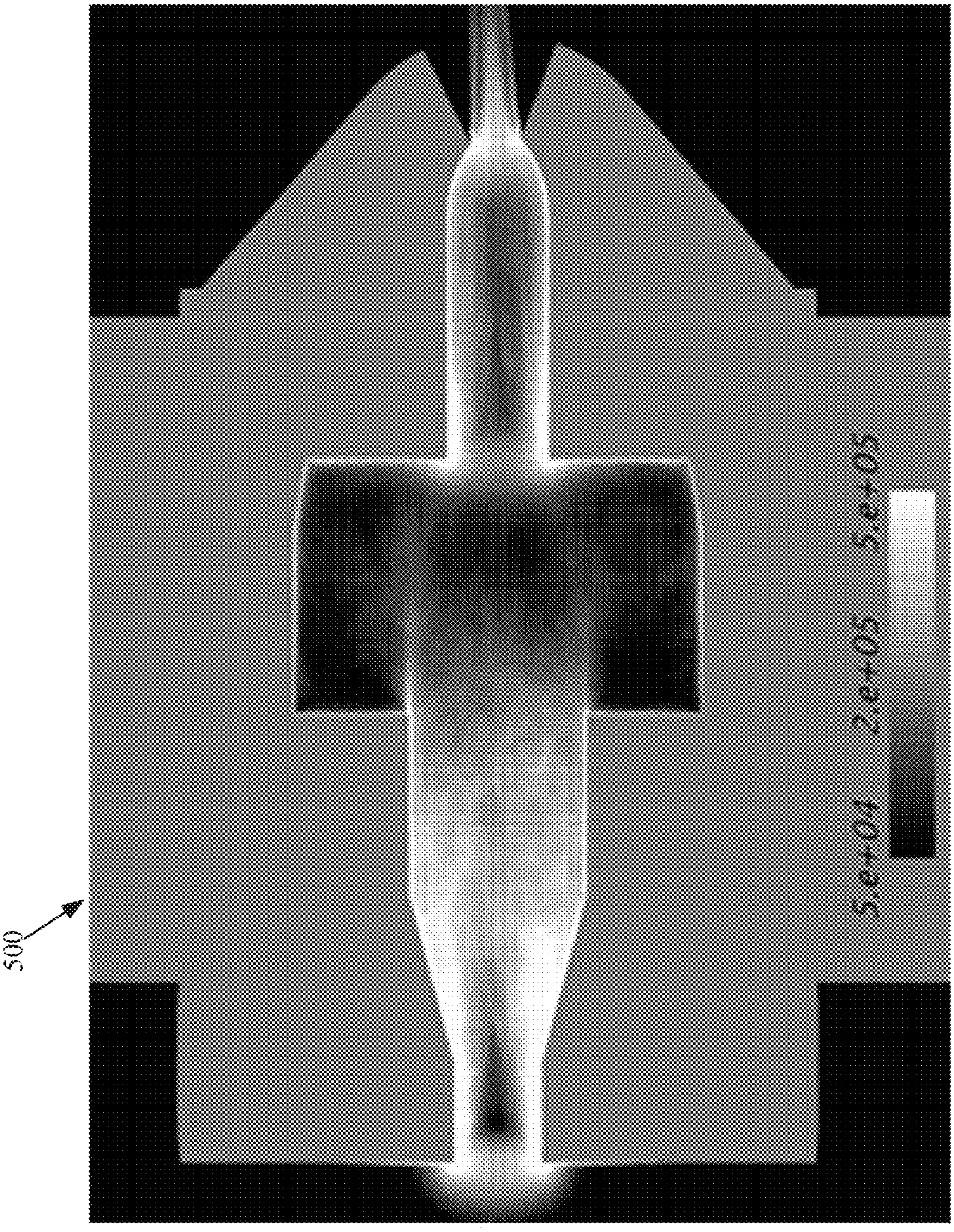

Results 500 of a simulation of water sprayed through the NGA 519 tip are illustrated in FIG. 5. For water, the clear edges of the boundary layer are not observed because the pre-orifice has produced a turbulent flow. The influence of the turbulence is observed near the cat eye orifice, where there is a non-zero strain rate throughout the fluid cross section.

Figure 6:
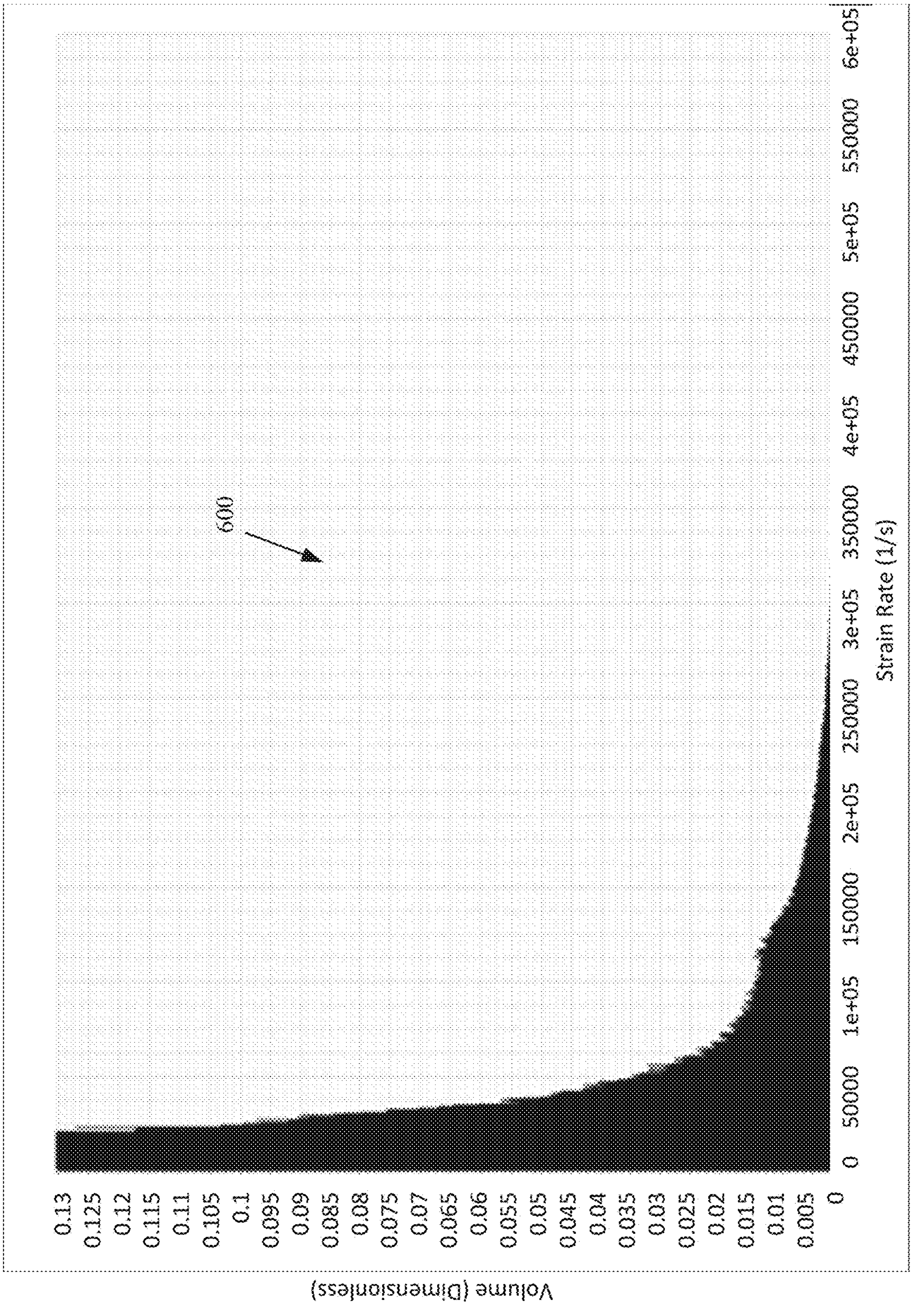
Figure 7:
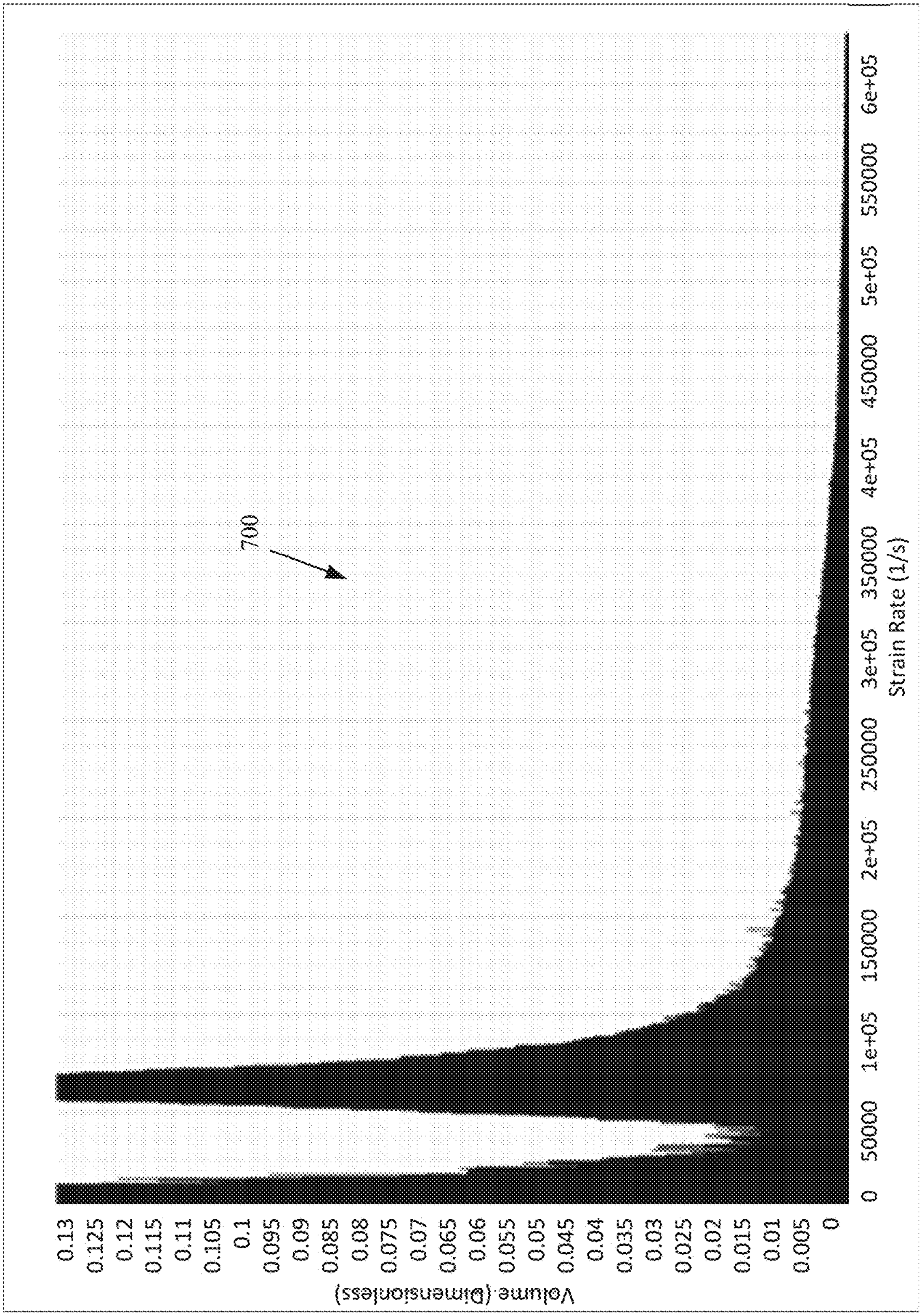
Figure 8:
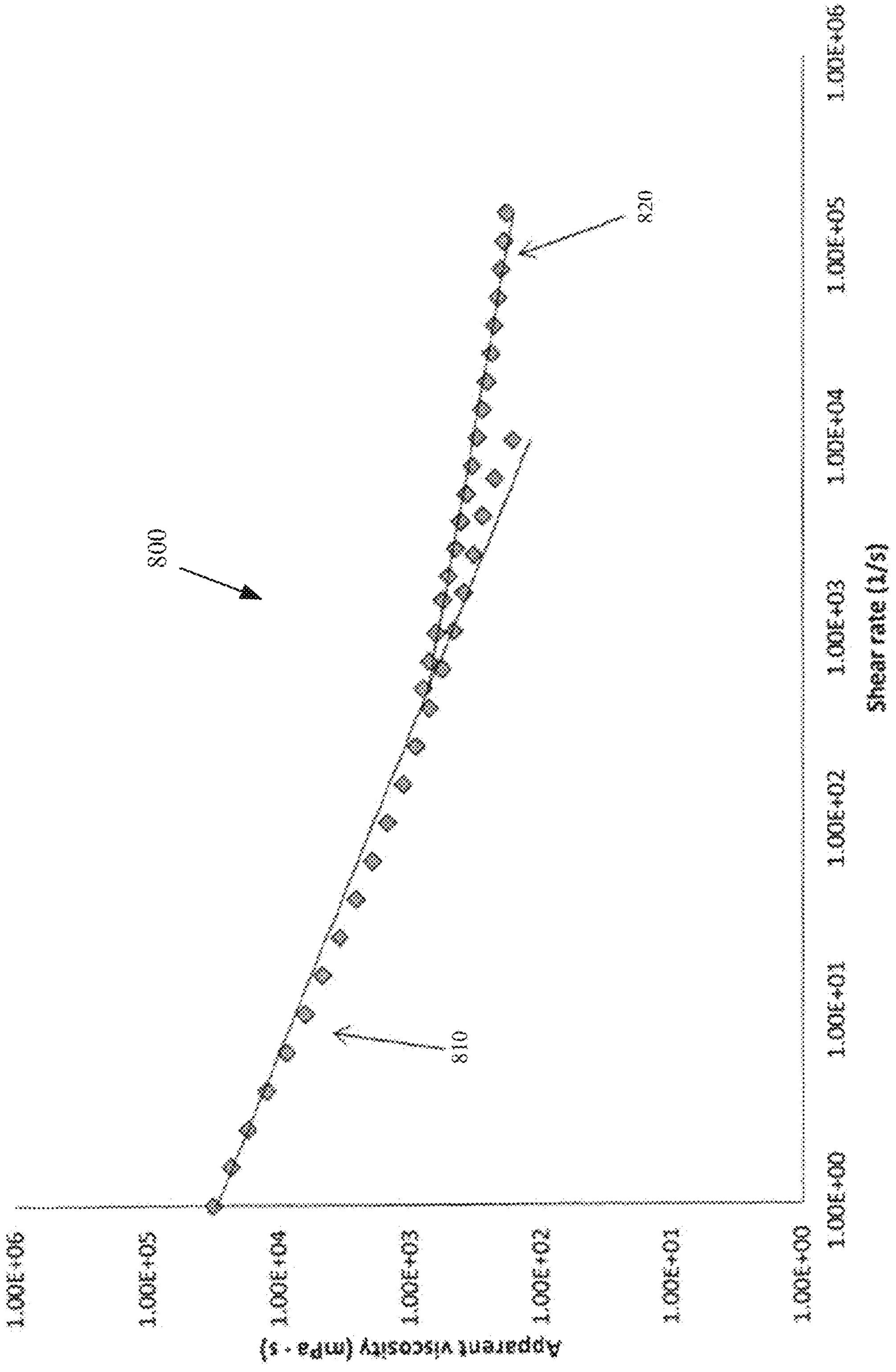

The difference in performance between laminar and turbulent flow can also be observed through volumetric histograms of strain rate 600 and 700, which appear in FIG. 6 for the '469 paint, and FIG. 7 for water, respectively. For the '469 paint, all realized strain rates resulted in the dissipation of turbulent energy. The total volume of paint that experiences a given strain rate is therefore monotonically decreasing with strain rate. For water, however, a spike in volumetric density is observed centered around $10^5$ $s^{-1}$. This peak occurs because the viscosity of water is low enough in the proper strain rate range to produce turbulence, which introduces additional volumetric concentration in the corresponding turbulent length scales.

The NGA 519 tip will not spray '469 paint particularly well at the given operating point. This is because the '469 paint viscosity in the critical shear rate range of $10^4$-$10^6$ $s^{-1}$ is too large to produce a turbulent flow.

With this information in mind, it is possible to better design the rheology of '469 paint. Two things are required: high viscosity at low shear rates to make certain the paint does not run while drying on a wall or when applied to a brush/roller, and a viscosity on the order of 10 mPa° s in the shear rate range of $10^4$-$10^6$ $s^{-1}$. These two parameters should ensure turbulent flow and therefore favorable spray performance, and can be achieved by modifying the power law expression generated experimentally for '469 paint.

A viscosity expression was required to run the simulations of water and '469 paint. In order to produce the expression, a curve was fit to experimentally measured viscosity as a function of shear rate, which is presented as results 800 in FIG. 8. The two experimental trials that were run have different power law relationships. Trial 2 was selected for having shear rate more appropriate for airless spraying. To produce a paint that is more favorable for airless spraying, the magnitude of the exponential must be increased. In other words, the shear thinning behavior of the paint needs to be amplified. The exponential term produced by curve fitting the experimental data has a value of −0.261. Trial 1, illustrated by reference number 810, had a curve fitting of $y=30088x^{0.599}$, with an $R^2$ value of 0.9912. Trial 2, represented by reference numeral 820, had a curve fitting of $y=3690.8x^{0.261}$, with an $R^2$ value of 0.9828.

Figure 9:
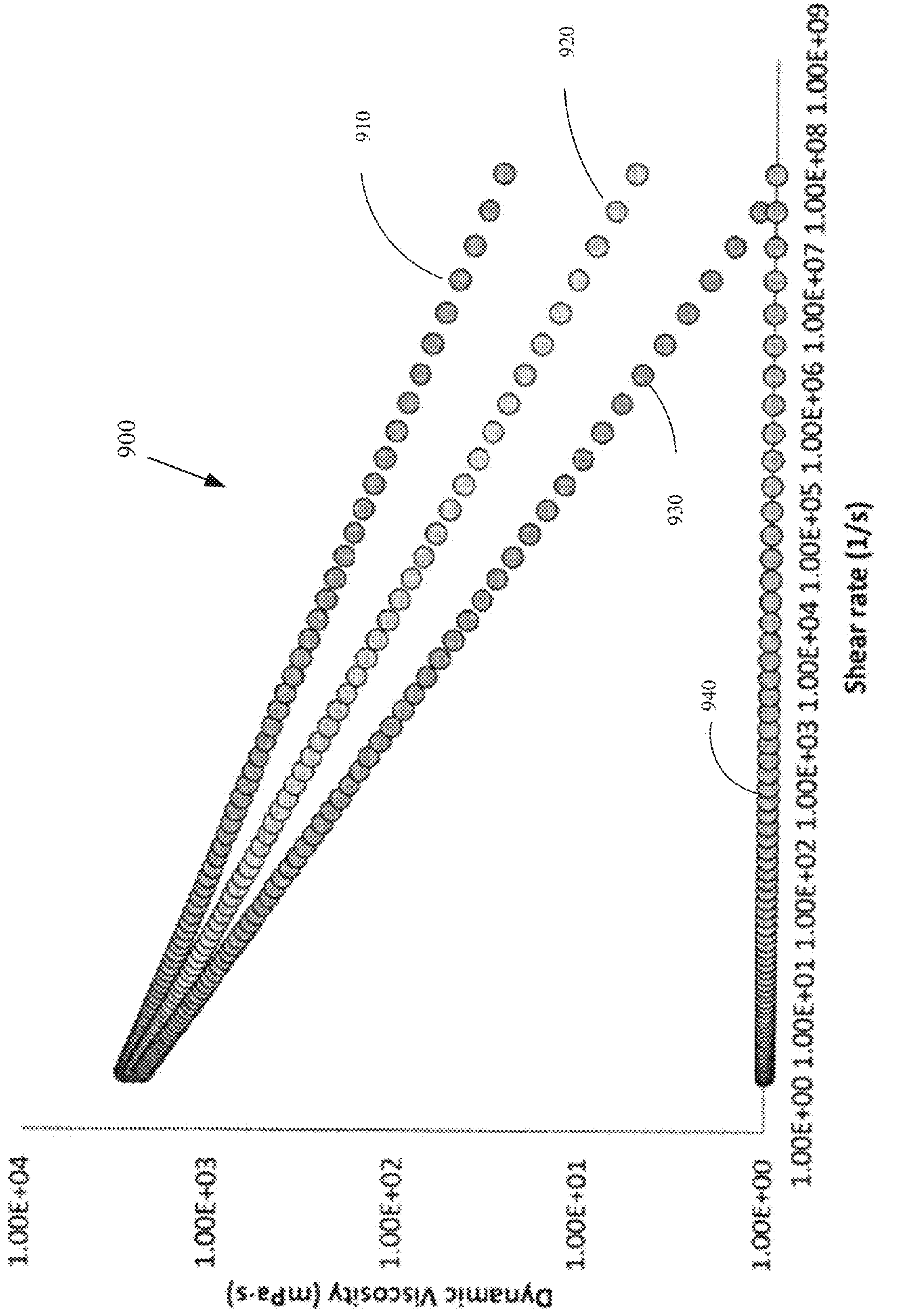

As illustrated in FIG. 9, the '469 façade value, represented by reference numeral 910, was modified to −0.35 and −0.45, illustrated as power law 1 and power law 2, represented by reference numbers 920 and 930, respectively. Both modified forms illustrate high viscosity at low shear rates, which ensures that paint, once sprayed, will stick firmly to a wall/roller/brush. Both modified forms are also presented with the results of a water sample 940.

Figure 10A:
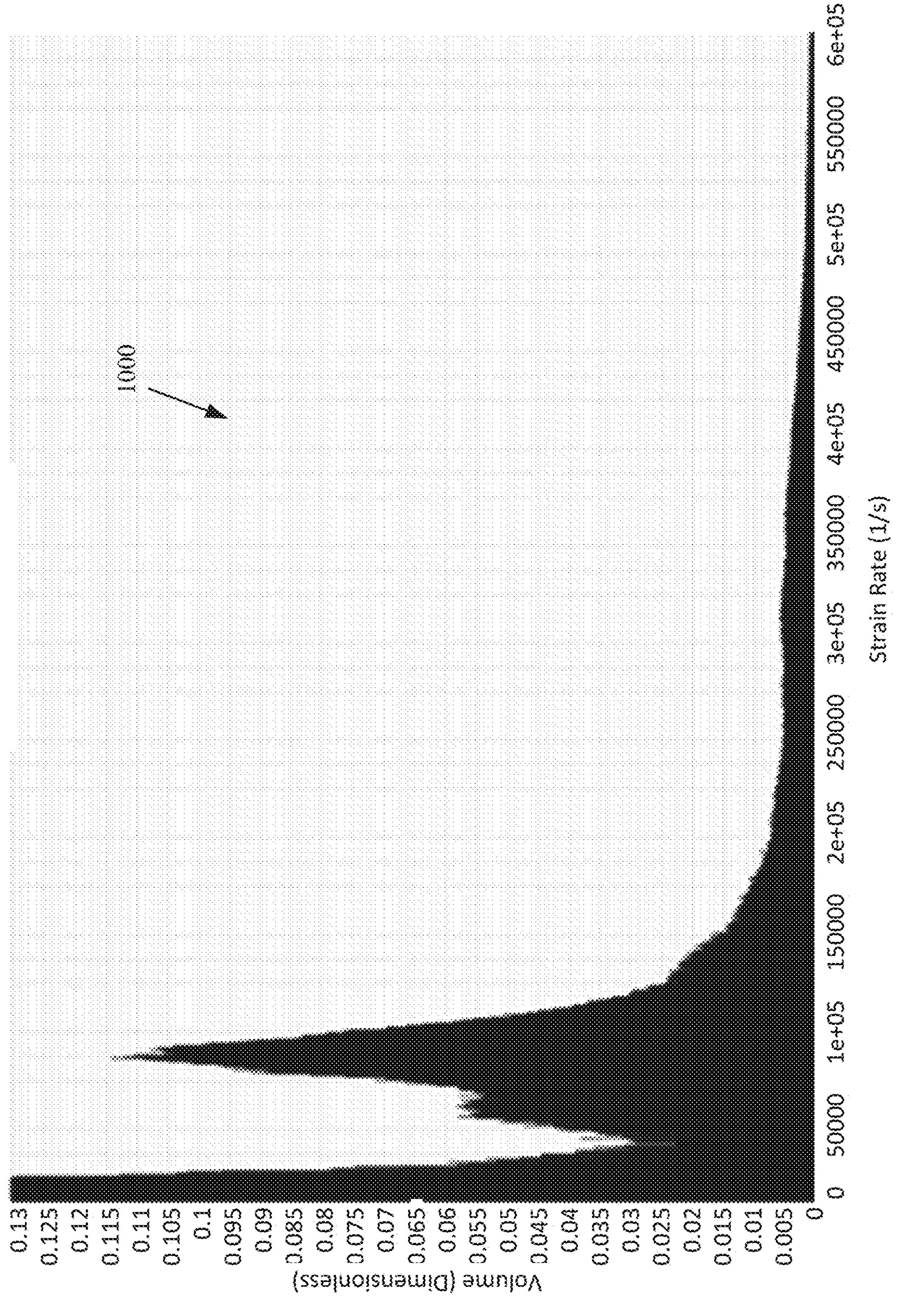
Figure 10B:
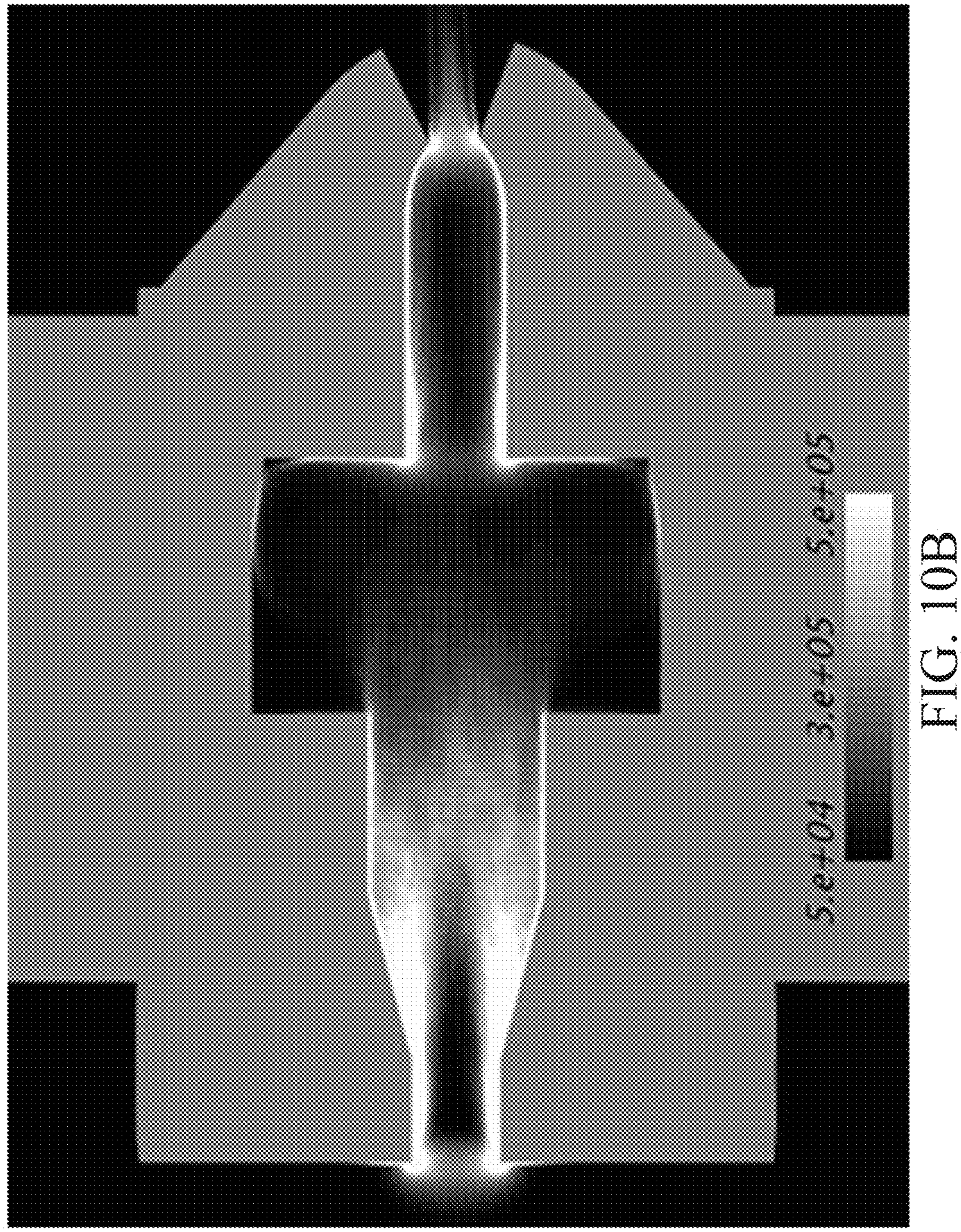
Figure 11A:
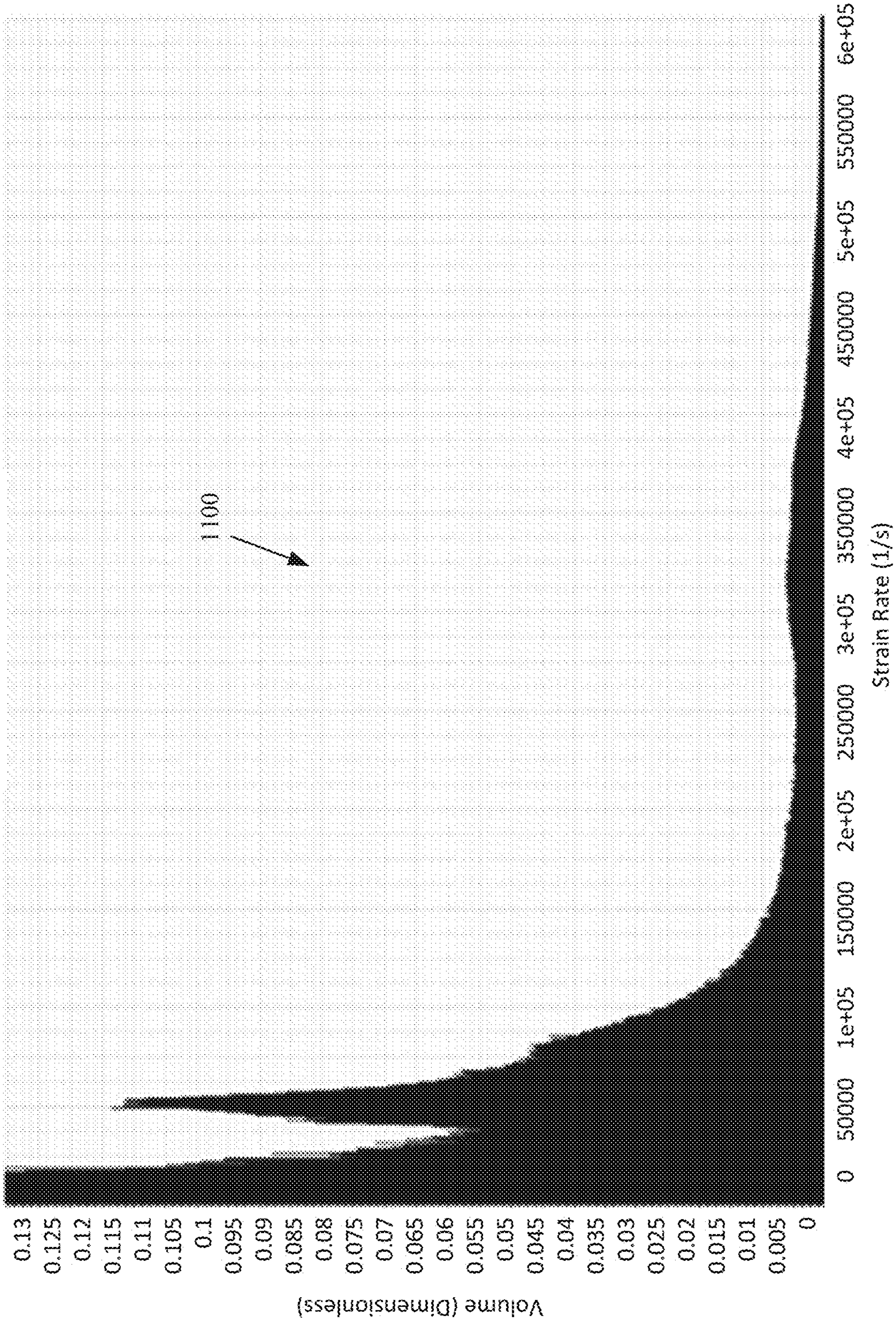
Figure 11B:
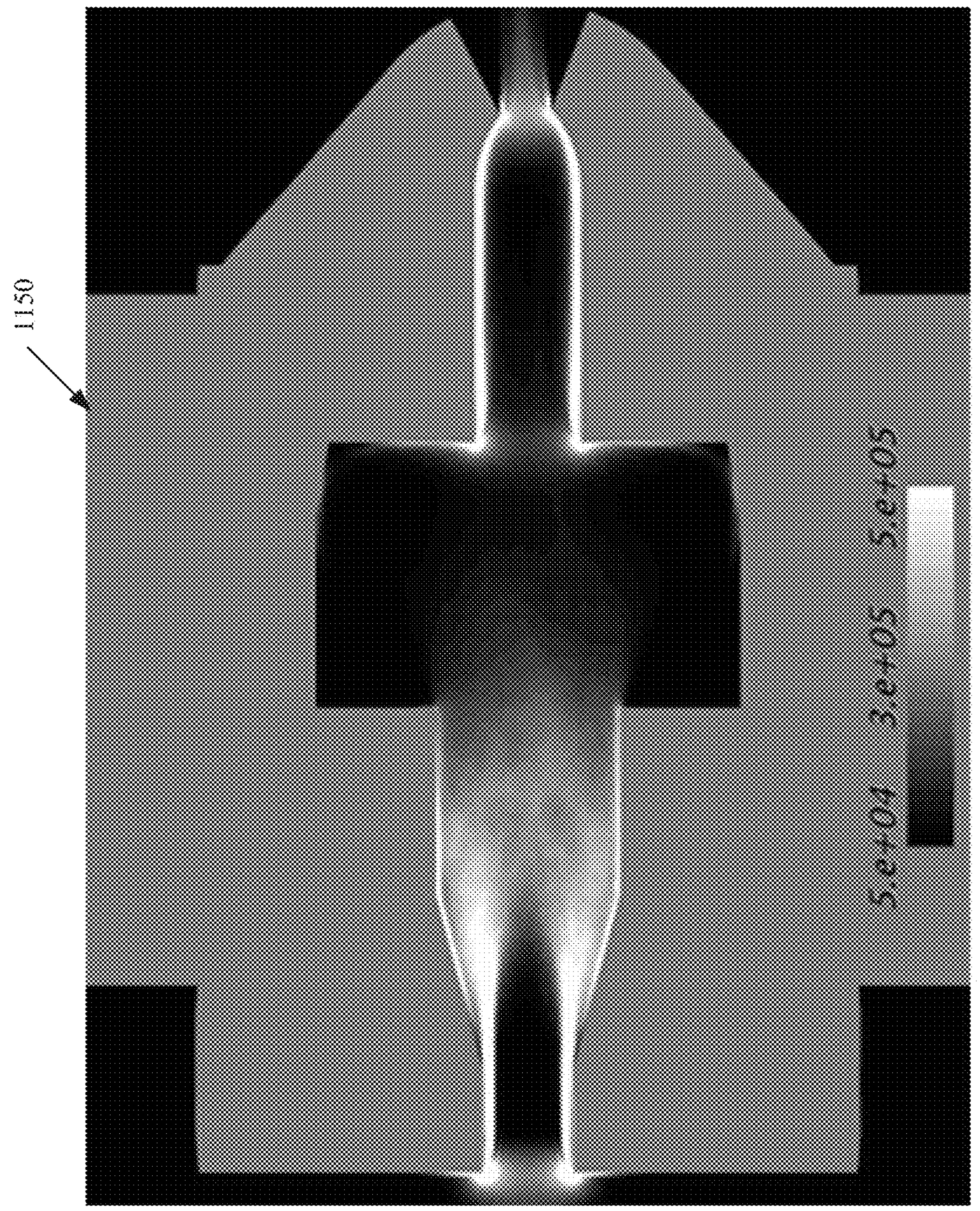

Simulations of the current '469 paint resulted in a laminar flow, while simulations of both modified '469 fluids results in turbulent flows. Histograms of the volumetric distribution of strain rates for the two modified fluids appear in FIGS. 10A and 11A as rate distributions 1000 and 1100, respectively. The corresponding strain rate contours for the fluids are illustrated in FIGS. 10B and 11B, as contours 1050 and 1150, respectively. Both cases have the characteristic distribution of turbulent length scales just below $10^5$ $s^{-1}$. The case with an exponential of −0.35 illustrates a more viscous flow, and therefore has a less distinct peak with an onset of dissipation at a lower strain rate. This result supports the hypothesis that increasing the shear thinning behavior of the paint has the potential to improve spray performance for the NGA tip. Because the viscosity at low shear rates is effectively unchanged from the current '469 paint, the modification should not impact performance for rolling or brushing.

Figure 12:
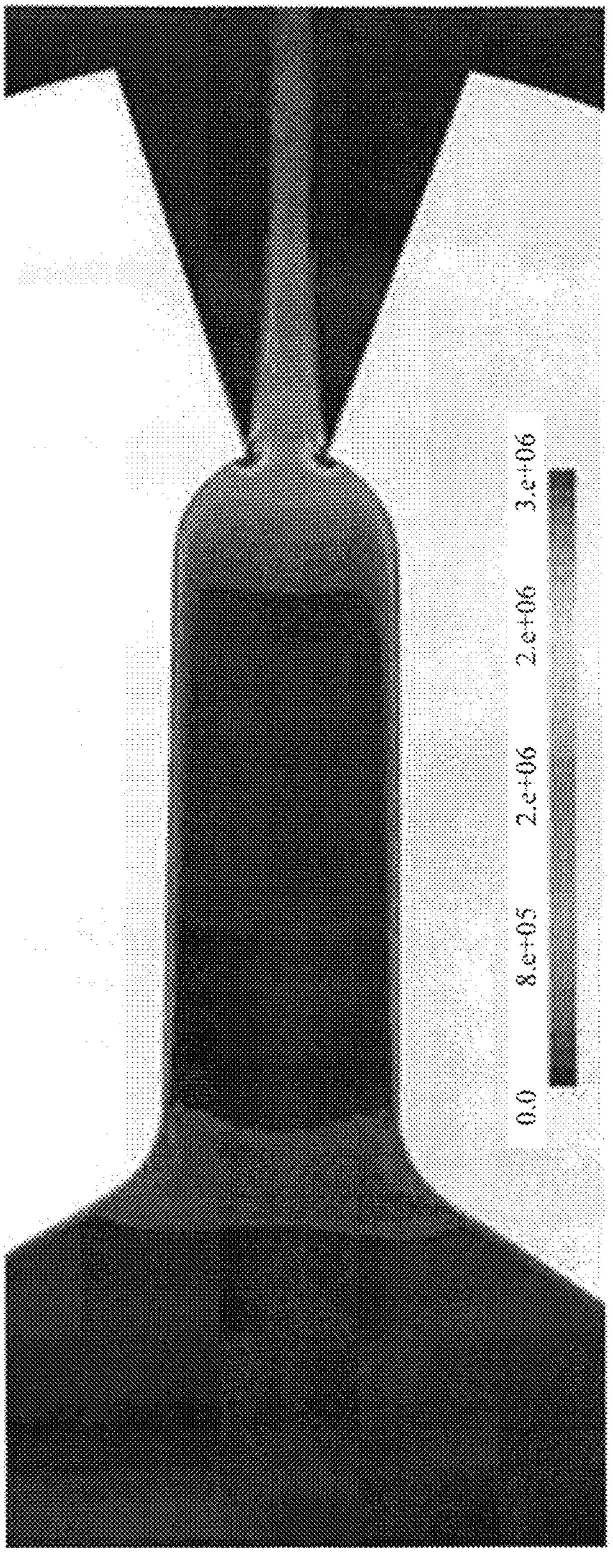
Figure 13:
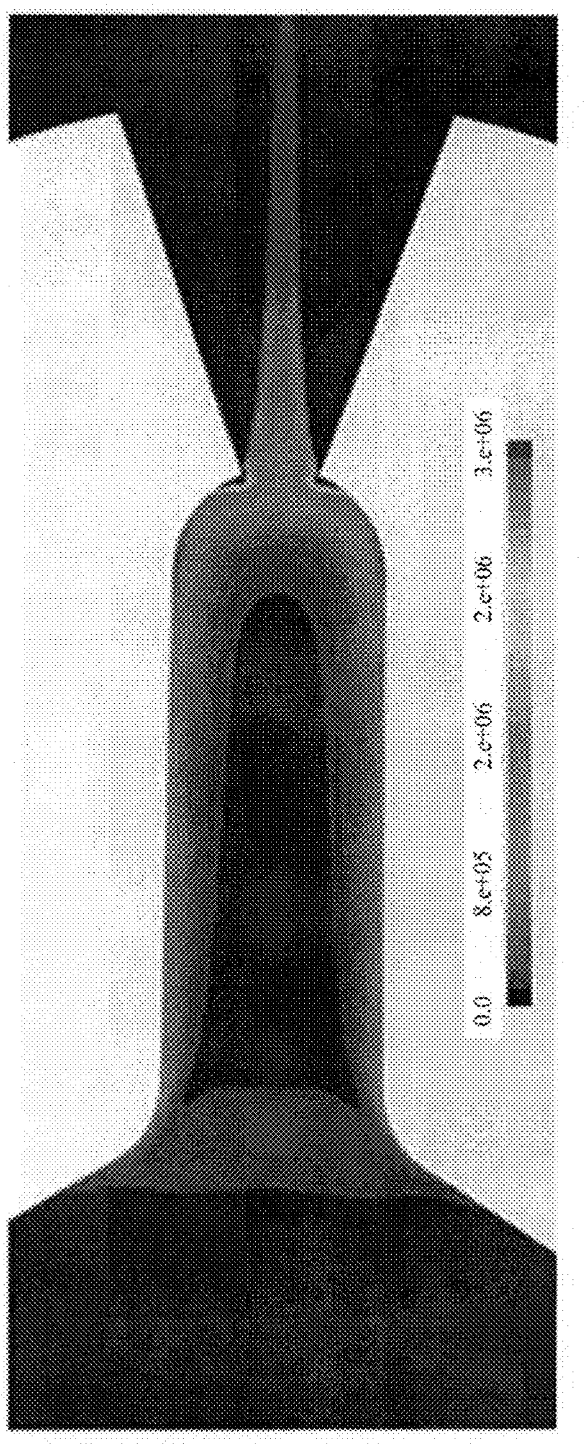

The '469 tip, illustrated in FIGS. 12 and 13 as contours 1200 and 1300, respectively, was also considered to potentially modify the paint rheology to improve atomization behavior. It is known that less viscous fluids are more easily atomized, which suggests that the improvements discussed above for the NGA519 tip may also improve performance for the '469 tip.

FIG. 12 illustrates a cross-section 1200 of one '469 tip spraying water at 1450 PSI. The contour shown in the strain rate. Similar to the NGA 519 tip, the prominence of strain near $10^{-}$-$10^6$ $s^{-1}$ is observed. This strain rate is preserved just downstream of the cat eye orifice, which is the region where primary atomization will occur, and where large scale topological features of the spray pattern will be determined (lines, tails, pattern shape, etc.). It is therefore favorable for paint to have a reduced viscosity in this strain rate neighborhood.

FIG. 13 illustrates the results when using '469 paint. Again, the prominence of strain of the same magnitude is observed, but a much thicker boundary layer is also observed. The thicker boundary layer is caused by the higher viscosity of the '469 paint when compared to water. However, downstream of the cat eye orifice, the strain rate appears very similar to the water case.

It is expected that the results would be qualitatively the same for high pressure spray tips as those shown with the '469 spray tip described herein. However, a slight upscaling of the strain rates would be expected, the wall strain rate would be greater, and strain rates in the boundary layer would also be greater. The important strain range would fall within $10^4$-$10^6$ $s^{-1}$, as only an approximate 20% increase in material flow for the same size tip would occur.

Although the present invention has been described with reference to preferred embodiments, workers skilled in the art will recognize that changes may be made in form and detail without departing from the spirit and scope of the invention. Additionally, while one example has been presented with respect to two different types of paint, it is also to be understood that similar methods can be applied for other fluid applications, including other types of paints, primers, coatings, etc.

What is claimed is:

1. A spray system comprising:

a fluid applicator;

a fluid pump that pumps a fluid from a fluid source to the fluid applicator, wherein the fluid pump operates at a pressure at or below 2,000 PSI;

an airless spray tip configured to couple to the fluid applicator and atomize the fluid, the airless spray tip comprising:

an inlet;

an outlet;

a flow path extending between the inlet and the outlet, the flow path comprising an internal geometry, comprising, sequentially in an upstream to downstream order:

a first cylinder;

a first expanding section that comprises a widening frustoconical surface that widens in a downstream direction;

a second cylinder that has a diameter that is larger than a diameter of the first cylinder;

a third cylinder that has a diameter that is larger than the diameter of the second cylinder and wherein the diameter of the third cylinder is larger than a length of the third cylinder;

a first contracting section that comprises a narrowing frustoconical surface that narrows in the downstream direction; and a fourth cylinder that has a diameter that is smaller than the diameter of the second cylinder and the diameter of the third cylinder; and wherein the internal geometry is sized such that the fluid has a viscosity on the order of 10 mPa·s in a shear rate range of $10^4$-$10^6$ $s^{-1}$ upstream of the outlet.

2. The spray system of claim 1, further comprising a heater that elevates the fluid to an application temperature selected to achieve the viscosity of the fluid in the spray tip.

3. The spray system of claim 1, wherein the pump operates at a spray pressure at or below 1,000 PSI.

4. The spray system of claim 1, wherein the internal geometry is configured to reduce overspray of the fluid from the fluid applicator.

5. The spray system of claim 1, wherein the first expanding section is longer in an upstream to downstream direction than the first cylinder.

6. The spray system of claim 1, wherein the first contracting section is shorter in an upstream to downstream direction than the first expanding section.

* * * * *